United States Patent [19]
Adiutori

[11] 3,901,081
[45] Aug. 26, 1975

[54] SOOT BLOWER WITH GAS TEMPERATURE OR HEAT FLOW DETECTING MEANS

[75] Inventor: Eugene F. Adiutori, Cincinnati, Ohio

[73] Assignee: Diamond Power Specialty Corporation, Lancaster, Ohio

[22] Filed: Apr. 4, 1974

[21] Appl. No.: 457,815

Related U.S. Application Data

[62] Division of Ser. No. 360,362, May 14, 1973, Pat. No. 3,827,102.

[52] U.S. Cl. ................................ 73/357; 73/357
[51] Int. Cl. ........................................ G01k 11/00
[58] Field of Search ...................................... 73/357

[56] References Cited
UNITED STATES PATENTS

| | | | |
|---|---|---|---|
| 339,756 | 4/1886 | Frew | 73/357 |
| 2,549,622 | 4/1951 | Moore et al. | 73/357 |
| 2,598,178 | 5/1952 | Källe | 73/357 |
| 2,697,554 | 12/1954 | Kendig | 73/357 X |
| 3,314,294 | 4/1967 | Colston | 73/357 |
| 3,383,919 | 5/1968 | Marcy et al. | 73/357 |
| 3,769,839 | 11/1973 | Innes | 73/357 X |

*Primary Examiner*—Jerry W. Myracle
*Assistant Examiner*—Frederick Shoon
*Attorney, Agent, or Firm*—Harness, Dickey & Pierce

[57] ABSTRACT

A retractable soot blower is used as a temperature detector or a heat flow detector. The lance tube of the blower acts as a temperature or a total heat sensing probe in addition to performing its normal boiler cleaning function, and when inserted in the combustion chamber of a steam generator, boiler, or the like, the temperature of the pressurized blowing medium, or the total heat flow into the blowing medium, is determinable as a function of the pneumatic resistance of the discharging orifice of the lance tube. The detector is adapted to provide the heat flux profile of the chamber during movements of the lance tube, and can be utilized in conjunction with various control apparatus to selectively meter unvaporized water to the blowing medium during cleaning operations in response to changes in heat flow into the blowing medium.

8 Claims, 2 Drawing Figures

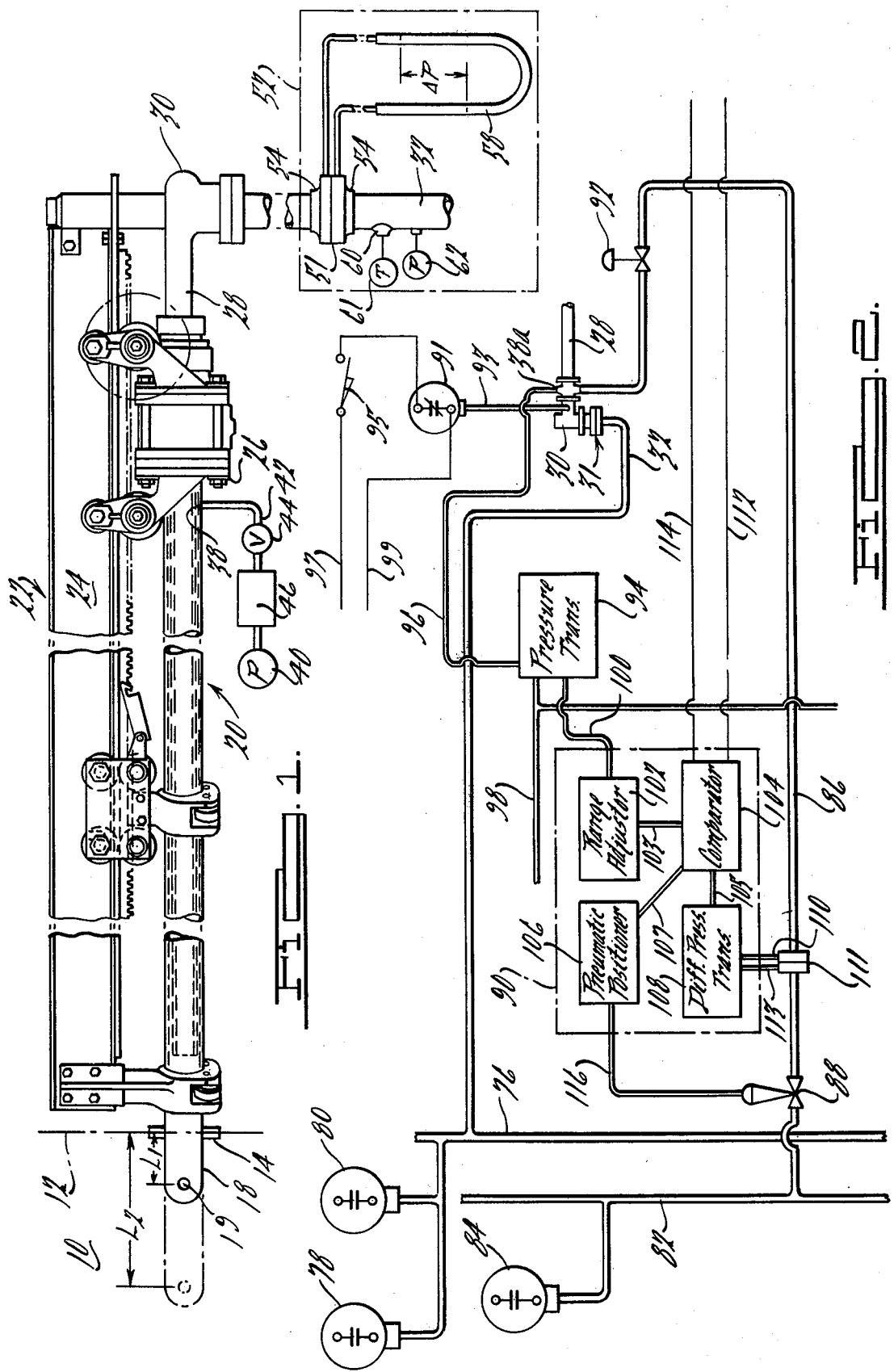

SOOT BLOWER WITH GAS TEMPERATURE OR HEAT FLOW DETECTING MEANS

REFERENCE TO RELATED APPLICATION

The present application is a division of application Ser. No. 360,362, filed May 14, 1973, now U.S. Pat. No. 3,827,102, issued July 30, 1974.

BACKGROUND OF THE INVENTION

This disclosure pertains generally to temperature and heat flow detecting devices, and more particularly to an improved temperature detector which relies upon the functionality between pneumatic resistance and temperature, or in another form of the invention to an improved heat flow detector which relies upon the functionality between pneumatic resistance and changes in heat flow.

The standard engineering instrument for measuring temperature in boilers, furnaces, and the like is the thermo-couple. A somewhat less standard instrument is the electric resistance temperature detector, usually referred to simply as a Resistance Temperature Detector (RTD). The underlying principle of the RTD is that electrical resistance is generally a function of temperature and therefore, by experimentally determining the functionality of a particular resistor, the temperature can be obtained by monitoring electrical resistance.

An analogous principle can be employed to create a Pneumatic Resistance Temperature Detector (PRTD), since the pneumatic resistance of an orifice or nozzle is also a function of the gas temperature. When the orifice or nozzle is operated at critical flow, the PRTD has a particular advantage over the standard instruments enumerated above in that the functionality between pneumatic resistance and temperature can be described mathematically by:

$$\frac{P}{W} \alpha \sqrt{\frac{T_{COOLANT}}{A_{NOZZLE}}} \quad \text{(Equation 1)}$$

where:
W = weight flow rate of the fluid
P = absolute pressure of the fluid
$T_{coolant}$ = absolute temperature of the fluid
$A_{nozzle}$ = the area of the nozzle Equation 1 may be solved for $T_{coolant}$ and equated by the insertion of a constant of proportionality $K_1$ to provide $$T_{coolant} = K_1 \left[ \frac{P \, A_{nozzle}}{W} \right]^{-2} \quad \text{(Equation 2)}$$

Equation 2 is the PRTD equation and demonstrates that any critical flow nozzle can be used to measure temperature if pressure and flow rate are determinable through the nozzle. Equation 2 also demonstrates that the only calibration requirement is the measurement of a single operating point for the purpose of determining the proper value to be assigned to the constant of proportionality ($K_1$).

Equation 2 may be adapted for practical use in measuring actual heat flux profiles in large boilers and steam generators by adapting conventional soot blower apparatus, i.e., the lance tube nozzles of long, retracting blowers to function as PRTD's. The actual heat flux profiles thus derived provide an improved understanding of boiler behavior and also aid in the design and operation of boiler components, including the soot blowers themselves.

To adapt soot blower apparatus for temperature detecting, the measurement of lance tube pressure and coolant flow rate is required, preferably by a determination exterior of the boiler. Both measurements, however, can be easily obtained by the addition of pressure sensor instruments, thereby providing an attractive method for measuring lance tube coolant exit temperature. From the measured coolant temperature rise along the lance tube and the measured coolant flow rate, the heat flux profile can be determined by incremental movement of the lance tube inwardly across the heated region of the boiler. Thus, any conventionally designed soot blower which is able to travel across a heated area has the capability of measuring heat flux, negating the need for employing thermocouple devices or additional probes. The PRTD soot blower affords particular advantages in that it is less expensive, longer lived, and more reliable than thermocouple systems when utilized in the intensely heated regions of boilers.

In adapting an existing soot blower for use as a Pneumatic Resistance Temperature Detector, a pressure sensing device such as a pressure gauge is required to provide a basis for determining lance tube pressure at the nozzles and a measurement of the flow rate of the coolant as shall hereinafter be described in particular detail. Thus, the PRTD which, in itself affords an improved means of measuring actual heat flux profiles, is enhanced by its adaptability to existing boiler hardware, and particularly to the soot blower apparatus.

The Pneumatic Resistance Temperature Detector of the subject invention may therefore be comprised of a long retracting soot blower having a lance tube telescopically movable over a stationary feed tube and supplemented by a pressure sensing gauge located proximate the upstream end of the lance tube, and metering means for providing a flow rate of the fluid discharged by the lance tube. It is therefore a general object of the subject invention to provide improved means for utilizing a soot blower as a Pneumatic Resistance Temperature Detector.

In the technology of soot blowers, the lance tubes are often subject to irreparable damage due to a misjudgement of the actual heat flux of the boiler. It is therefore another object of the subject invention to provide a true heat flux profile so that a lance tube design which is satisfactory for the given application can be more easily and positively attained.

In the operation of modern soot blowers, a certain volume of blowing medium is required to suitably clean the boiler tubes. In order to maintain the lance tubes at a safe temperature level to obviate failure however, the operation typically requires additional volumes of the blowing medium. Generally speaking, to provide a safety factor, it has been found that the volumetric quantities actually used could be reduced if an actual heat flux profile for the individual combustion chamber could be established. It is therefore another object of the subject invention to provide improved means whereby the flow rate of the blowing medium can be accurately reduced to a level consistent with the actual lance tube cooling requirement.

By throttling a selective quantity of water into the blowing medium, the heat of vaporization can also be utilized to cool the lance tubes, assist cleaning, and minimize the consumption of collant. Heretofore, however, the danger of damaging the boiler tubes by thermal shock has created difficulty and militated against the use of this technique except in unavoidable circumstances. It is therefore a further object of the subject invention to improve the practicality of utilizing water as an agent for cleaning boiler tubes and preventing overheating of soot blower lance tubes.

Other objects, features, and advantages of the present invention will hereinafter become apparent from the subsequent description and the appended claims, taken in conjunction with the accompanying drawings.

BRIEF DESCRIPTION OF THE DRAWINGS

FIG. 1 is an exemplary schematic diagram of a preferred embodiment of the subject invention illustrating the utilization of a long retracting soot blower as a Pneumatic Resistance Temperature Detector (PRTD); and FIG. 2 is a schematic diagram of an exemplary application of the soot blower illustrated in FIG. 1 as a Pneumatic Resistance Heat Detector (PRQD), the PRQD being utilized as a sensor for a controller to limit the amount of unvaporized water discharged from the soot blower.

DETAILED DESCRIPTION OF THE PREFERRED EMBODIMENT

The Pneumatic Resistance Temperature Detector of the subject invention measures temperature as a function of pneumatic resistance of a pressurized fluid flowing through a nozzle or orifice. The lance tube of a conventional type of soot blower is, in accordance with a preferred embodiment of the present invention, adapted for use as a Pneumatic Resistance Temperature Detector (PRTD). With reference to FIG. 1 of the drawings, a partial interior portion of a steam boiler is indicated generally at 10, the boiler having an outer wall 12. Boiler area 10 constitutes a heated region wherein the heat flux profile is to be measured. The wall 12 carries a wallbox 14 through which a lance tube 18 of a long retracting soot blower assembly 20 is projected into and withdrawn from the boiler setting.

The assembly 20 is disposed on the exterior of the boiler proximate the wallbox opening, and includes a support and track structure 22 comprising an I-beam 24 which extends outwardly from the boiler wall 12. The lance tube 18 includes one or more nozzles 19 movable into and outwardly from the heated region by known means which does not per se form a part of this invention, but which conventionally includes a motor driven carriage 26 slidable on a feed tube 28.

The lance tube nozzles 19 in addition to their normal function of projecting the cleaning medium against the heat exchanging surfaces, are adapted for use as a Pneumatic Resistance Temperature Detector when lance tube pressure is established. For this purpose, the lance tube 18 is tapped as at 38 and a pressure gauge 40 is connected to the lance tube via a conduit 42. Preferably a surge tank 46 is interposed between the tap 38 and the pressure gauge 40 to obviate any tendency of the pressure signal to oscillate. The conduit may also include a shutoff valve 44 for the purpose of closing the conduit when the assembly is to be utilized only for normal soot blower operation and when temperature profiles are not required. The pressure gauge 40 need not be a highly accurate instrument, but the gauge should have good resolution and repeatability, i.e., in the range of 0.1 to 0.2 percent.

A blowing medium supply pipe 32 is connected to a poppet valve 30 located proximate the upstream end of the feed tube 28 with the pipe 72 having a flow meter 52 of any suitable type, such as, for example, an orifice plate 51, interposed between a pair of mating orifice flanges 54. A tap is provided in each of the orifice flanges on opposite sides of the orificed plate 51, the taps being suitably connected to a differential gauge, such as a U-tube or manometer 58. The manometer 58 provides a measurement of the differential pressure across the plate 51. The meter 52 also includes a temperature sensing instrument which may be a thermometer 61 disposed in a thermometer well 60 and suitable static pressure sensing instrument means such as pressure gauge 62. Utilizing the pressure in the lance tube 18 and the flow rate of the coolant, the soot blower assembly 20 is adapted to function as a PRTD.

As hereinbefore indicated, the basis for a PRTD has previously been given by Equation 2:

$$T_{coolant} = K \left[ \frac{P \, A_{nozzle}}{W} \right]^2$$

To suit the above described PRTD, Equation 2 may be modified as follows: first $$A_{noz} \overset{\alpha}{\propto} 1 + 2a \, (T_{prtd} + 460) \qquad \text{(Eq. 3)}$$

and $$P_{noz} = (P_{1t} + 14.7) \, \Delta P_{1t} \qquad \text{(Eq. 4)}$$

therefore by substitution in Equation 2

$$T_{prtd} = K \left[ \frac{(1 + 2a \, (T_{prtd} + 460))((P_{1t} + 14.7) - \Delta P_{1t})}{W_{cool}} \right]^2 - 460 \qquad \text{(Equation 5)}$$

now $$W_{cool} = K_{orif} \sqrt{\frac{(P_1 + 14.7)\Delta P_1}{(T_1 + 460)}} \qquad \text{(Equation 6)}$$

and $$K = (T_{cool\,nozz}_{iso} + 460) \left[ \frac{K_{orif} \sqrt{\frac{(P_1 + 14.7)\Delta P_1}{(T_1 + 460)}}}{(1 + 2a \, (T_{cool\,nozz}_{est} + 460))(P_{1t} + 14.7 - \Delta P_{1t})} \right]^2_{iso} \qquad \text{(Equation 7)}$$

now $$\Delta P_{1t} = \Delta P_{friction} + \Delta P_{acceleration} \quad \text{(Eq. 8)}$$

and:

$$\Delta P_{friction} = \frac{fL_iG^2}{2gD_i\rho_{cool}}\left(144\ \frac{in^2}{ft^2}\right) \quad \text{(Equation 9)}$$

$$G = \frac{K_{orif}\sqrt{\frac{(P_1+14.7)\Delta P_1}{(T_1+460)}}}{.785\ D_i^2} \quad \text{(Equation 10)}$$

$$F \approx 0.02 \quad \text{(Equation 11)}$$

$$\rho_{cool} \cong 0.075\left[\frac{(P_{1t}+14.7)(530\ °R)}{(14.7\ psia)(T_{cool\ est}+460)}\right] \quad \text{(Equation 12)}$$

therefore:

$$\Delta P_{friction} = 0.647 \times 10^{-6}\left[\frac{K_{orif}^2(P_1+14.7)\Delta P_1(T_1+460)+(T_{est}^{cool}+460)}{(P_{1t}+14.7)(T_1+460)}\Sigma\ \frac{L_i}{D_i}\ 5\right] \quad \text{(Equation 13)}$$

$$\Delta P_{acceleration} = \left[\left(\frac{G^2}{\rho_{cool\ est}\ g}\right)_{hot} - \left(\frac{G^2}{\rho_{cool\ est}\ g}\right)_{cold}\right]\frac{1}{144}\ \frac{ft^2}{in^2} \quad \text{(Equation 14)}$$

using Equations 10, 12 and 14 then:

$$\Delta P_{acceleration} = .1294 \times 10^{-3}\left[\frac{K_{orif}^2(P_1+14.7)\Delta P_1}{D_{i,tip}^4(T_1+460)(P_{1t}+14.7)}\right](T_{cool\ nozz\ est}-T_1) \quad \text{(Equation 15)}$$

therefore using Equations 5, 7, 13 and 15

$$T_{prtd\ iso\ est} = (T_{cool\ nozz\ est}+460)\left[\frac{K_{orif}\sqrt{\frac{(P_1+14.7)\Delta P_1}{(T_1+460)}}}{(1+2a(T_{cool\ nozz\ est}+460))(P_{1t}+14.7-\Delta P_{1t})}\right]_{iso}^2$$

$$\left[\frac{(1+2a(T_{est}^{cool\ nozz}+460))(P_{1t}+14.7-\Delta P_{1t})}{K_{orif}\sqrt{\frac{(P_1+14.7)\Delta P_1}{(T_1+460)}}}\right]^2 - 460 \quad \text{(Equation 16)}$$

WHERE:

| | |
|---|---|
| $A_{NOZ}$ | Cross-Section area of nozzle (IN²) |
| $C_{p,COOL}$ | Specific heat of coolant $\left[\frac{BTU}{\#\ °F}\right]$ |
| $D_i$ | Inside diameter of lance section (FT.) |
| $D_{i,\ TIP}$ | Inside diameter of lance tip section (FT.) |
| $D_o$ | Outside diameter of lance (FT.) |
| f | Coefficient of friction for coolant inside lance |
| FLOW | Flow rate of coolant (SCFM) |
| g | Acceleration of gravity $g=32.2\ \left[\frac{FT.}{SEC.^2}\right]$ |
| G | Flow per area for lance tube flow $\left[\frac{\#}{FT.^2\ SEC.}\right]$ |
| ISO | Subscript - affixed to values taken at the ISOthermal point |
| K | A constant |
| $K_{ORIF}$ | Orifice coefficient |
| | $K_{ORIF} = .4528\ \left[\frac{\#}{SEC.}\sqrt{\frac{°F}{PSI\ -\ IN_{H_2O}}}\right]$ |
| L | Travel of lance (FT.) |
| $L_i$ | Length or partial length of lance section exposed to furnace atmosphere (FT.) |
| $P_1$ | Pressure at the orifice, upstream (PSIG) |
| $\Delta P_1$ | Change in pressure across the orifice (IN H₂O) |
| $\Delta P_{Acceleration}$ | Change in pressure through the lance tube due to the acceleration of the coolant (PSI) |
| $\Delta P_{Friction}$ | Change in pressure through the lance tube due to the friction of the coolant on the walls (PSI) |
| $P_{1t}$ | Pressure at the lance tube pressure tap (PSIG) |
| $\Delta P_{1t}$ | Change in pressure through the lance tube (PSI) |
| $P_{NOZ}$ | Pressure at the nozzle of the lance tube (PSIA) |
| Q | The difference between the total heat flow through the exposed lance at any point and the total heat flow through the exposed lance at the isothermal point |
| | $(Q_{total}-Q_{ISO})\ \left[\frac{BTU}{HR.}\right]$ |
| $\frac{\overline{Q}}{A}$ | Average heat flux beyond isothermal setting $\left[\frac{BTU}{HR.\ FT.^2}\right]$ |
| $\frac{\Delta Q}{\Delta A}$ | Local heat flux obtained by differencing total heat loads |

$$\left[\frac{BTU}{HR.-FT.^2}\right]$$

$T_1$     Temperature at the orifice (°F)

$T_{cool.\ nozz\ est.}$     Estimate of coolant temperature at the nozzle (°F)

$T_{PRTD}$     Temperature of coolant at the nozzle (°F)

$W_{cool.}$     Flow rate of coolant $\left[\frac{\#}{SEC.}\right]$ a     Coefficient of thermal expansion of nozzle $\left[\frac{IN}{IN.-°F}\right]$ Having now obtained an expression for $T_{prtd}$, the heat flux profile may now be determined. Equation 17 provides the relationship of heat added to the flowing coolant:

$$Q = W_{cool}\ (T_{prtd} - T_{\substack{iso\\nozz}})\ (C_p{'}_{cool}) \quad \text{(Eq. 17)}$$

By dividing equation 17 by the surface area exposed in the heated region 10, an expression for heat flux is derived as follows:

$$\frac{Q}{A} = \frac{Q}{\Pi D_o L} \quad \text{(Equation 18)}$$

By taking the difference between respective longitudinal nozzle positions ($L_2-L_1$) within the heated region 10 the change of heat flow with respect to the change of area is given by Equation 19.

$$\frac{\Delta Q}{\Delta A} = \frac{Q2-Q1}{\Pi D_o(L_2-L_1)} \quad \text{(Equation 19)}$$

Thus, a suitable expression for heat flux profile is now obtained.

Returning to Equation 16 as recited above, it will be noted that $T_{prtd}$ includes second order effects such as lance pressure drop and nozzle expansion. For providing a simplified expression and eliminating such second order effects it will be seen that $T_{prtd}$ is approximately equal to the following expression:

$$T_{prtd} \cong 530\ \left(\frac{P_{1,\ ISO}}{P_1}\right)\left(\frac{\Delta P_{1,\ ISO}}{\Delta P_1}\right)\left(\frac{P_{LT}}{P\ LT,\ ISO}\right)^2 - 460 \quad \text{(Equation 20)}$$

Equation (20) demonstrates the importance of obtaining highly precise data for $P_1, \Delta P_1$, and $P_{LT}$, both isothermal and non-isothermal. Thus, it is preferred that the isothermal data be taken within a short time of the non-isothermal data and the instruments should not be moved, bumped, or adjusted in the interval. Note further that with respect to $P_1$, the surge tank 46 is adapted to obviate any tendency for the pressure signal to oscillate. Therefore, readability is enhanced. Careful examination of equation (20) further indicates that the measurement of $T_{prtd}$ in no way depends on the absolute value of $P_1$, $\Delta P_1$, or $P_{lt}$ i.e., only relative changes from isothermal to non-isothermal are important. Additional precision may be added to the results by obtaining a number of repeat readings at each data point; i.e., for various values of L. It will further be noted that any conventional retractable soot blower is readily adaptable to becoming a substantially accurate PRTD in the indicated manner.

In addition to temperature sensor functions, the soot blower assembly 20 may also be adapted to function as a heat sensor in various control or monitoring applications. As previously indicated when an acutal heat flux profile of a combustion chamber is provided, the volumetric quantity of gaseous blowing medium can be reduced to a level consistent with the cooling requirement of the lance tube 18. By throttling unvaporized water into the blowing medium, the heat of vaporization thereof can be utilized in reducing still further the quantity of blowing medium required for lance tube cooling, and moreover reduce erosion of the boiler tubes due to the decreased flow rate. In this regard it will be noted that all but a selective small amount of unvaporized water, as for example 2 gpm, must be vaporized in the lance tube to obviate the possibility of thermal shock to the boiler tubes. Based upon this small quantity of unvaporized water, it will be appreciated that the pneumatic resistance to fluid flow through the lance tube nozzles will be a function of the change in weight flow rate of the mixture as well as temperature changes. In FIG. 2 the soot blower apparatus is utilized as a Pneumatic Resistance Heat Detector (PRQD) in a system for metering water into the blowing medium in response to changes in pneumatic resistance of the lance tube nozzles, whereby the amount of unvaporized water discharged from the blower is controlled. For purposes of clarity, identical components are identified by the same numeral in FIG. 2 as was used in FIG. 1.

With reference then to FIG. 2, the poppet valve 30 is located on the upstream end of the feed tube 28 and connected via the piping 32 to a gaseous medium or air supply pipe 76. An orifice 31 is disposed upstream of the valve 30 to amplify the effect of heat flow on pressure. For monitoring the operation of the air supply or header piping 76 and to provide a substantially constant source of pressure, high and low pressure switches 78 and 80, respectively are provided in fluid communication with the header 76. For purposes of illustration, if we assume a relatively constant header pressure of approximately 360 psig, the high pressure switch could be set to close at 376 psig and open at 360 psig whereas the low pressure switch could be set to close at 359 psig and open at 344 psig, thus providing a monitor on the pressure source. A suitable alarm may be connected to either, or both, of the pressure switches to give either an audio or visual alarm indicating fluctuating The water system for tempering the gaseous medium includes a water header 82 suitably connected to a pressurized source in excess of the amplified feed tube operating pressure. The water header 82 also may include a water header pressure switch 84 for monitoring appropriate pressures therein, and for insuring levels in excess of the air header pressure. The feed tube 28 is connected to the water header 82 via a water line 86, the connection to the feed tube 28 being proximate of a tap 38a. The water branch line 86 includes a control valve 88 responsive to a pneumatic signal emanating from a controller 90, the operation of the controller 90 to be hereinafter explained. The water branch line 86 further includes a mechanical valve 92 which is adapted to operate in unison with the poppet valve 30 on the soot blower assembly 20, the valve 30 being normally closed in a fully retracted position of the lance tube 18 relative to the boiler wall 12 and opened in response to longitudinal movement of the lance tube 18 inwardly in the boiler 10.

The means for throttling a selective amount of unvaporized water into the feed tube 28, includes a pressure transmitter 94 connected via a conduit 96 to the tap 38a. The pressure transmitter 94 is connected to a central instrument air supply line via a conduit 98 and provides a variable output control signal to the controller 90 via a conduit 100 in response to pressure changes in the feed tube 28. The conduit 100 is connected to a range adjuster element 102 within the controller 90, the controller 90 further including a comparator element 104, a pneumatic positioner 106, and a differential pressure transmitter 108. The differential pressure transmitter 108 is adapted to sense the pressure drop across an orifice 111 in the water branch line 86 via conduits 110 and 113 and provides an output signal via a conduit 105 to the ccomparator element 104 as a function thereof. The comparator 104 also receives a signal via a conduit 103 from the range adjusted 102 and, in the event of no flow, is adapted to control a panel circuit (not shown) providing an alarm by means of electrical conductors 112 and 114. The comparator element 104 also provides an output signal via a conduit 107 to the pneumatic positioner 106 which is linked via a conduit 116 to the pneumatic control valve 88 for selectively positioning the valve and therefore controlling the flow in the water branch line 86.

With respect to the sequence of operation, when the soot blower assembly 20 is operated, air pressure is sensed downstream of the poppet valve 30 in the conduit 96, the signal being applied to the pressure transmitter 94. The pressure transmitter 94 provides a variable output signal, depending upon the pressure sensed, which is applied from the transmitter 94 to the controller 90, the controller 90 operating the control valve 88. The tap 110 downstream of the control valve 88 will measure flow and feed this data to the controller 90. This feedback signal will be compared with the variable input signal from the pressure transmitter 94 and the resultant will be used to regulate the positioning of the control valve 88. These same two signals, i.e., the applied signal and the feedback signal, will be monitored by the controller 90 and if the difference is too great, cause an electrical contact, preferably having a 15 second delay, to close. This contact closure will signal the control panel via the conductors 112, 114 that an alarm condition exists and the panel will immediately retract the soot blower 20. In the event that the poppet valve 30 falls closed, or if the normal blowing medium is lost during the soot blower operation, the absence of a pressure input signal to the pressure transmitter 94 will turn off the output signal to the controller 90, which in turn will close the control valve 88 interrupting the flow of liquid. At the same time, the absence of pressure in the feed tube 28 can be sensed via a conduit 93 which in turn can close a pressure switch 91 activating a suitable alarm mechanism (not shown) connected via conductors 97 and 99. The alarm circuit further includes a limit switch 95 which is normally open when the lance tube 18 is in its fully retracted position and adapted to close upon inward movement thereof. Thus, it will be seen that the limit switch 95 will prevent activation of the alarm during such times when the soot blower assembly 20 is normally depressurized. Thus, the operation of the soot blower apparatus 20 can be fully monitored for adequately protecting the lance and boiler tubes.

Further, it will be noted that the water control is based upon measuring the instantaneous heat flow into the blowing medium by the PRQD principle and controlling the water flow in proportion to the heat flow, so that the amount of unvaporized water discharged from the nozzles does not exceed the desired amount. The control system is set up so that the water flow is responsive to feed tube pressure which by design is responsive to heat flow into the blowing medium. Moreover, the amount of unvaporized water at the nozzles by utilization of the PRQD is maintained constant and independent of changes in the boiler load and the lance tube insertion depth.

While it will be apparent that the preferred embodiments of the invention disclosed herein are well calculated to fulfill the objects above stated, it will be appreciated that the invention is susceptible to modification, variation, and change without departing from the proper scope or fair meaning of the subjoined claims.

What is claimed is:

1. Apparatus for detecting thermodynamic conditions in a combustion region comprising:
    a feed tube having one end adapted to be connected to a source of pressurized fluid;
    a lance tube connected to the opposite end of said feed tube, means supporting said lance tube for movement relative to an opposite end of said feed tube, said lance tube having an end portion selectively locatable in said combustion region;
    nozzle means located on said end portion of said lance tube for restricting the flow of said pressurized fluid; and
    detecting means responsive to a pressure condition at said nozzle means for detecting thermodynamic conditions in said combustion region.

2. The apparatus as recited in claim 1 wherein said detecting means includes sensor means located exteriorly of said combustion region for measuring thermodynamic conditions.

3. The apparatus as recited in claim 2 wherein said sensor means is a pressure gauge operatively connected to an oppsite end portion of said lance tube.

4. The apparatus as recited in claim 1 wherein said detecting means includes metering means for measuring the quantity of pressurized fluid supplied by said source.

5. The apparatus as recited in claim 1 wherein said detecting means includes transmitter means for providing a variable output signal in response to pressure changes at said nozzle means.

6. Apparatus for detecting thermodynamic conditions in a combustion region comprising: a feed tube having one end adapted to be connected to a source of pressurized fluid; a lance tube supported 7. A thermodynamic probe selectively insertable in a combustion region comprising: an elongated tube having one end selectively located in said region and an opposite end in fluid communication with a source of pressurized fluid; orifice means located at said one end for restricting the flow of said fluid, means located at an opposite end of said tube and responsive to said orifice means for detecting a thermodynamic condition therein, and a feed tube telescopically located in said tube and connected to said pressurized source.

8. The probe as recited in claim 7 which includes a support structure for movably supporting said tube for longitudinal and rotational movement relative to said feed tube.

* * * * *

UNITED STATES PATENT OFFICE
CERTIFICATE OF CORRECTION

PATENT NO. : 3,901,081
DATED : August 26, 1975
INVENTOR(S) : Eugene F. Adiutori

It is certified that error appears in the above-identified patent and that said Letters Patent are hereby corrected as shown below:

Column 3, line 2, "collant" should be --coolant--.
Column 6, In description of $K_{ORIF}$, ".4528" should be --.45284--.
Column 8, line 56, after "fluctuating" insert --pressures in the air header.--
Column 10, line 62, after "supported" insert --for movement relative to an opposite end of said feed tube, said lance tube having an end portion selectively locatable in said combustion region; nozzle means located on said end portion of said lance tube for restricting the flow of said pressurized fluid, detecting means responsive to a pressure condition at said nozzle means for detecting thermodynamic conditions in said combustion region, said detecting means including transmitter means for providing a variable output signal in response to pressure changes at said nozzle means, a source of unvaporized liquid connected to said feed tube, and valve means responsive to said output signal for metering a predetermined quantity of said liquid into the flow stream of said pressurized fluid. --

Signed and Sealed this twenty-fifth Day of November 1975

[SEAL]

Attest:

RUTH C. MASON
*Attesting Officer*

C. MARSHALL DANN
*Commissioner of Patents and Trademarks*